(12) United States Patent
Fisher

(10) Patent No.: US 7,076,253 B2
(45) Date of Patent: Jul. 11, 2006

(54) SYSTEM AND METHOD FOR DATA EXCHANGE IN A HIGH DATA RATE WIRELESS COMMUNICATION SYSTEM

(75) Inventor: Ellis T. Fisher, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 573 days.

(21) Appl. No.: 10/006,055

(22) Filed: Dec. 6, 2001

(65) Prior Publication Data

US 2003/0109260 A1    Jun. 12, 2003

(51) Int. Cl.
H04Q 7/20    (2006.01)
(52) U.S. Cl. .................. 455/450; 455/451; 455/452.1; 455/453; 455/455; 370/328; 370/329; 370/338; 370/341
(58) Field of Classification Search .............. 455/450, 455/451, 452.1, 452.2, 453, 455; 370/328, 370/329, 341, 395.21, 395.41, 338
See application file for complete search history.

(56) References Cited

U.S. PATENT DOCUMENTS

| 4,901,307 A | | 2/1990 | Gilhousen et al. |
| 5,103,459 A | | 4/1992 | Gilhousen et al. |
| 5,946,633 A | * | 8/1999 | McAlinden ................ 455/551 |
| 6,031,845 A | * | 2/2000 | Walding .................... 370/468 |
| 6,253,063 B1 | * | 6/2001 | Cudak et al. .............. 455/63.1 |
| 6,714,794 B1 | * | 3/2004 | O'Carroll ................... 455/466 |
| 6,879,580 B1 | * | 4/2005 | Djuphammar et al. ...... 370/352 |

FOREIGN PATENT DOCUMENTS

| EP | 1 001 572 A1 | | 5/2000 |
| WO | 99/49690 | | 9/1999 |
| WO | WO99-49690 | * | 9/1999 |
| WO | 01/41368 A1 | | 6/2001 |
| WO | 01/67789 A2 | | 9/2001 |
| WO | 01/67794 A1 | | 9/2001 |

* cited by examiner

Primary Examiner—Stephen D'Agosta
(74) Attorney, Agent, or Firm—Philip Wadsworth; Sandra L. Godsey; Sandra L. Godsey

(57) ABSTRACT

According to a disclosed embodiment, a processor is configured to detect when a wireless mobile unit is in an High Data Rate (HDR) area. The processor is further configured to determine a need for exchanging data between the wireless mobile unit and a base station. The processor invokes a data burst optimizer to exchange data between the wireless mobile unit and the base station when the wireless mobile unit is in the HDR area. The data burst optimizer is configured to exchange data between the wireless mobile unit and the base station in an HDR area. The data burst optimizer is further configured to continuously detect when the wireless mobile unit is in the HDR area. The data burst optimizer is configured to stop exchanging data between the wireless mobile unit and the base station when the wireless mobile unit is not in the HDR area.

24 Claims, 3 Drawing Sheets

SYSTEM AND METHOD FOR DATA EXCHANGE IN A HIGH DATA RATE WIRELESS COMMUNICATION SYSTEM

BACKGROUND

1. Field

The present invention relates generally to wireless communication devices and systems and more specifically to exchanging data in a wireless communication system using High Data Rate ("HDR") technology.

2. Background

The increasing use of the Internet as a source of information and a conduit for communication, along with the proliferation of wireless devices, such as cell phones, laptop computers with wireless modems, and wireless personal digital assistants ("PDA"), has created a rapidly expanding wireless Internet. The nature of the wireless Internet is to provide a constant and consistent mobile access connection similar to a land based connection.

However, for typical applications that run on the wireless Internet, such as e-mail programs, calendar programs, applications that use the File Transfer Protocol ("FTP"), bid auction programs, etc., the connection requirements are very different. These applications require "bursting" of data based on invocable events as well as close synchronization with a server. For example, an e-mail program requires a connection and synchronization with an e-mail server only when there is e-mail to be sent and received. Thus, a wireless device (also referred to as a "mobile unit" in the present application) or the operator of the wireless device, needs to know when to connect to a server, for example, to synchronize and exchange e-mail.

Synchronization software currently used by personal computers ("PC") synchronizes e-mail, files, etc. based on the lowest common denominator of connection performance. For example, if one PC is connected to the Internet via a T-1 line at 1.4 Mbps (Megabits per second) and a second PC is connected to the Internet via a 14.4 kbps (kilobits per second) modem, the synchronization software will synchronize files on the two PCs at the slower 14.4 kbps speed. The synchronization software currently in use does not determine an optimal time to synchronize a data exchange between two devices based on the speed with which data can be exchanged.

The advent of HDR technology, a high-speed, high capacity wireless technology optimized for packet data services, offers the opportunity for wireless devices to "burst" data over a single 1.25 MHz channel at a peak rate of 2.4 Mbps. However, for a wireless device and a base station to transfer data at HDR speed, the wireless device and the base station must be within an HDR area or cell. For example, a person using an HDR-enabled wireless device, such as an HDR-enabled cell phone, would have to send e-mail to a base station while the HDR-enabled cell phone was in an HDR area to be able to utilize HDR speed. Therefore, either the operator or the HDR-enabled cell phone the operator is using would have to determine the right time (i.e. when the HDR enabled cell phone is in an HDR area) to send data to the base station to take advantage of HDR speed.

SUMMARY

There is thus a need in the art for a system and method to automatically synchronize and transfer data at HDR speed between a wireless mobile unit and a base station when the wireless mobile unit is in an HDR area.

Embodiments disclosed herein address the above stated needs by automatically synchronizing and transferring data at HDR speed between a wireless mobile unit and a base station when the wireless mobile unit is in an HDR area.

In one aspect of the invention, a processor or software object is configured to detect when a wireless mobile unit is in an HDR area. The processor is further configured to determine a need for exchanging data between the wireless mobile unit and a base station. The processor invokes a data burst optimizer to exchange data between the wireless mobile unit and the base station when the wireless mobile unit is in the HDR area.

In one aspect, the data burst optimizer is configured to exchange data between the wireless mobile unit and the base station in an HDR area. For example, the data burst optimizer transmits a logon name and password to the base station to authenticate the wireless mobile unit. The data burst optimizer is further configured to continuously detect when the wireless mobile unit is in the HDR area. In one aspect, the data burst optimizer is configured to stop exchanging data between the wireless mobile unit and the base station when the wireless mobile unit is not in the HDR area.

DETAILED DESCRIPTION

The present invention is directed to system and method for data exchange in a high data rate wireless communication system.

The drawings in the present application and their accompanying detailed description are directed to mere example embodiments of the invention. The word "exemplary" is used exclusively herein to mean "serving as an example, instance, or illustration." Any embodiment described herein as "exemplary" is not necessarily to be construed as preferred or advantageous over other embodiments.

Figure 1:
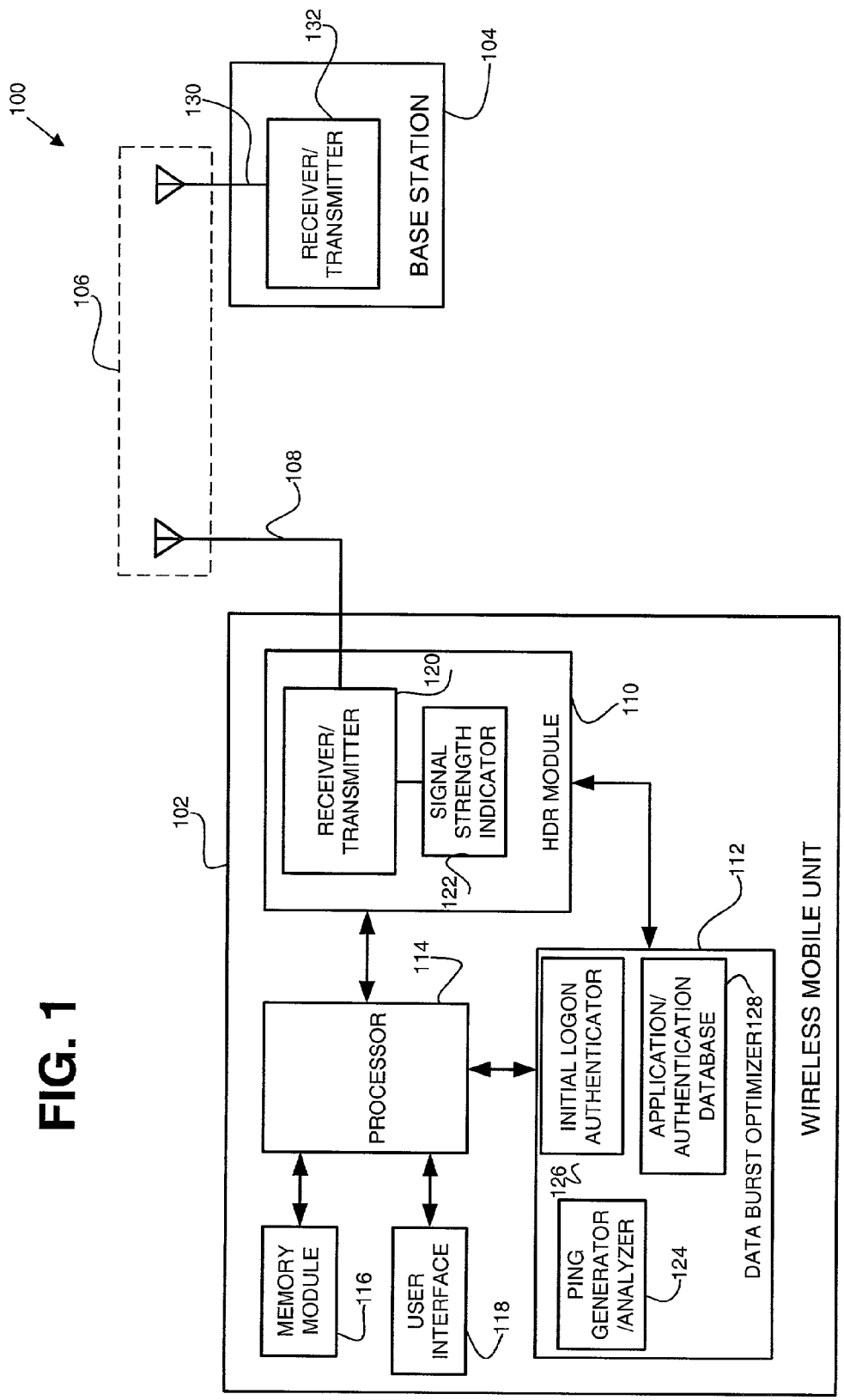
FIG. 1 is a block diagram of an exemplary wireless communication system in accordance with one embodiment of the invention.

FIG. 1 illustrates an exemplary wireless communication system in accordance with one embodiment of the invention. Exemplary wireless communication system 100 shown in FIG. 1 can comprise, for example, part of a Code Division Multiple Access ("CDMA") communication system configured to be interoperable with HDR technology. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to HDR communication systems, and the present invention can be used in HDR communication systems, such as that disclosed in U.S. patent application entitled "Method and Apparatus for High Rate Packet Data Transmission,", U.S. Pat. No. 6,574,211.The disclosure in that patent is also hereby fully incorporated by reference into the present application.

As shown in FIG. 1, wireless communication system 100 comprises wireless mobile unit 102 and base station 104. Wireless mobile unit 102 communicates with base station 104 at a high data rate in HDR area 106 utilizing antenna 108. Wireless mobile unit 102 can be, for example, an HDR-enabled CDMA cell phone, an HDR-enabled PDA, or a laptop computer with an HDR modem. Utilizing HDR technology, wireless mobile unit 102 is configured to communicate with base station 104 in HDR area 106 using a single, data-dedicated 1.25 MHz channel at a peak data rate of 2.4 Mbps. HDR area 106 can be a CDMA cell that also supports HDR technology, which is compatible with CDMA voice systems.

Continuing with FIG. 1, wireless mobile unit 102 comprises HDR module 110, data burst optimizer 112, processor 114, memory module 116, and user interface 118. The flow of information into, between, and from the modules is indicated in the block diagram of FIG. 1 by arrows which also indicate the direction of information flow. HDR module 110 comprises receiver/transmitter 120 and signal strength indicator 122. In one embodiment, HDR module 110 can be an HDR modem. Receiver/transmitter 120 is configured to receive HDR data packets from base station 104 and transmit HDR data packets to base station 104 in HDR area 106 via antenna 108. By way of background, HDR data packets are formatted and addressed using Internet Protocol ("IP").

Signal strength indicator 122 is configured to indicate when wireless mobile unit 102 is in an HDR area, such as HDR area 106, by measuring the strength of an HDR carrier signal broadcast by a base station, such as base station 104. For example, when the signal strength of the HDR carrier signal broadcast by base station 104 reaches a sufficient level as indicated by signal strength indicator 122, wireless mobile unit 102 is in HDR area 106 and can exchange data at HDR speed with base station 104.

Continuing with FIG. 1, memory module 116 can comprise a read only memory ("ROM") chip, a hard disk drive, a flash memory card, a random access memory ("RAM") module, or other memory device used to store data and programs in a manner known in the art. Memory module 116 is coupled to processor 114 so that processor 114 can read information from, and write information to, memory module 116. User interface 118, which is coupled to processor 114, allows a user to input data into and access data from wireless mobile unit 102. User interface 118 can comprise a keypad, an LCD display, or other input or output device that allows a user to communicate with wireless mobile unit 102.

Continuing with FIG. 1, data burst optimizer 112 is coupled to processor 114 and HDR module 110. Data burst optimizer 112 comprises ping generator/analyzer 124, initial logon authenticator 126, and application/authentication database 128. In one embodiment, data burst optimizer 112 can be included in processor 114. Data burst optimizer 112 can be invoked whenever wireless mobile unit 102 is in an HDR area, such as HDR area 106, and wireless mobile unit 102 has data to be sent to an HDR-enabled base station, such as base station 104.

Once invoked, data burst optimizer 112 is configured to automatically exchange data at HDR speed with an HDR-enabled base station so long as wireless mobile unit 102 remains in an HDR area. For example, when data burst optimizer 112 is invoked it will automatically send data to and receive data from base station 104 at HDR speed provided that wireless mobile unit 102 is in HDR area, e.g. HDR area 106. Once invoked, data burst optimizer 112 is further configured to continually detect whether wireless mobile unit 102 is in an HDR area, such as HDR area 106.

In one embodiment, data burst optimizer 112 can continually "ping" a base station, such as base station 104, to detect whether wireless mobile unit 102 is in an HDR area, such as HDR area 106. By way of background, "ping" sends out a special packet called the Internet Control Message Protocol ("ICMP") Echo Request packet. ICMP packets are special IP control messages that are used to send network information between two machines that are connected on a network. When a machine receives an Echo Request, it responds with an Echo Reply, and places the original Echo Request packet into the data field of the Echo Reply. Thus, for example, data burst optimizer 112 can "ping" base station 104 and detect whether wireless mobile unit 102 is connected, or still connected, to base station 104 by analyzing the Echo Reply packet sent by base station 104. By "pinging" base station 104, data burst optimizer 112 can further detect if wireless mobile unit 102 is connected to base station 104 at HDR speed by similarly analyzing the Echo Reply packet sent by base station 104.

In one embodiment, data burst optimizer 112 can detect whether wireless mobile unit 102 is in an HDR area by reading the signal strength indication on signal strength indicator 122. For example, when data burst optimizer 112 detects a signal strength indication on signal strength indicator 122 that exceeds a predetermined level, burst optimizer 112 would determine wireless mobile unit 102 is in an HDR area, e.g. HDR area 106, and can exchange data with base station 104 at HDR speed.

Continuing with FIG. 1, ping generator/analyzer 124 is configured to "ping" a base station, such as base station 104, via receiver/transmitter 120 and antenna 108 when data burst optimizer 112 is invoked. Ping generator/analyzer 124 is further configured to receive and analyze a return "ping" packet from base station 104. Initial logon authenticator 126 is configured to send a logon name and password to base station 104 to authenticate wireless mobile unit 102 when data burst optimizer 112 is invoked, i.e. when it has been determined that wireless mobile unit 102 is in an HDR area and has data to be exchanged with the base station.

Application/authentication database 128 provides a list of each application that wireless mobile unit 102 uses to exchange data with a base station, such as base station 104. In one embodiment, application/authentication database 128 can be included in memory module 116. It is noted that the base station, such as base station 104, with which wireless mobile unit 102 exchanges data is connected to the Internet in a manner known in the art. Application/authentication database 128 further provides a user name and password to authenticate each application in application/authentication database 128.

For example, the first application (i.e. application one) in application/authentication database 128 may be an e-mail application. Such applications would be followed by a user name and password required for authentication. By way of another example, the second application in application/authentication database 128 may be an auction application that logs into another application, such as a web application. In the present example, such web application would be similarly followed by a user name and password required for authentication.

In one embodiment, application/authentication database 128 is invoked after initial logon authenticator 126 authenticates wireless mobile unit 102 by sending the initial logon name and password to a base station, such as base station 104, and receiving authentication from the base station. Once application/authentication database 128 is invoked, the user name and password corresponding to the first application in application/authentication database 128 is sent to a base station, such as base station 104, for authentication.

In one embodiment, once invoked, application/authentication database 128 sends the user name and password corresponding to the first application in application/authentication database 128 to base station 104. If data burst optimizer 112 detects that wireless mobile unit 102 is still in HDR area 106 after the user name and password corresponding to the first application is authenticated, data burst optimizer 112 will exchange any data that needs to be exchanged with base station 104 at HDR speed. As discussed above, data burst optimizer 112 can detect whether wireless mobile unit 102 is still in an HDR area by "pinging" or by reading the signal strength of base station 104.

If data burst optimizer 112 detects that wireless mobile unit 102 is no longer in an HDR area, e.g. HDR area 106, data burst optimizer 112 will shut down and cease sending further data to base station 104 (i.e. without updating the data in the first application). After the first application has had an opportunity to exchange data with base station 104, the user name and password corresponding to the second application in application/authentication database 128 is sent to base station 104. If data burst optimizer 112 detects that wireless mobile unit 102 is still in HDR area 106, data burst optimizer 112 will exchange any data from the second application with base station 104 at HDR speed.

Each application in application/authentication database 128 will, in turn, be authenticated and have an opportunity to exchange data with base station 104, so long as optimizer 112 detects that wireless mobile unit 102 is in an HDR area. Data burst optimizer 112 will shut down after the last application in application/authentication database 128 has had an opportunity to exchange data with base station 104. As stated above, if data burst optimizer 112 detects that wireless mobile unit 102 is no longer in HDR area 106 prior to or during data exchange in an application, data burst optimizer 112 will shut down without updating data to that application.

Continuing with FIG. 1, in one embodiment processor 114 is configured to determine whether wireless mobile unit 102 is in an HDR area, such as HDR area 106. Processor 114 can determine when wireless mobile unit 102 is in an HDR area by either reading the signal strength indication of a base station HDR carrier signal on signal strength indicator 122 or by "pinging" the base station. For example, when processor 114 detects a signal strength indication on signal strength indicator 122 that exceeds a predetermined level, wireless mobile unit 102 is in an HDR area, such as HDR area 106.

In one embodiment, processor 114 is configured to determine if wireless mobile unit 102 has data to exchange with a base station, such as base station 104. Processor 114 is further configured to invoke data burst optimizer 112 when wireless mobile unit 102 has data to exchange with a base station and wireless mobile unit 102 is in an HDR area. Processor 114 can be a microcontroller, a microprocessor, a digital signal processing ("DSP") chip, or an application specific integrated circuit ("ASIC") programmed to perform the functions as described herein.

Continuing with FIG. 1, base station 104 comprises antenna 130 and receiver/transmitter 132. Receiver/transmitter 132 is configured to receive HDR data packets from wireless mobile unit 102 and transmit HDR data packets to wireless mobile unit 102 in HDR area 106 via antenna 130. In one embodiment, base station 104 can be connected to an e-mail server, a file transfer protocol server, an applications server, and/or a data base server via the Internet in a manner known in the art.

Thus, FIG. 1 illustrates an exemplary wireless communication system wherein a data burst optimizer in a wireless mobile unit is configured to automatically exchange data with a base station at HDR speed in an HDR area. The data burst optimizer is further configured to continually detect whether the wireless mobile unit is in an HDR area, and to shut down when the data burst optimizer detects the wireless mobile unit is no longer in the HDR area. Thus, the data burst optimizer illustrated in FIG. 1 automatically provides an optimal exchange of data between a wireless mobile unit and a base station at HDR speed.

Figure 2:
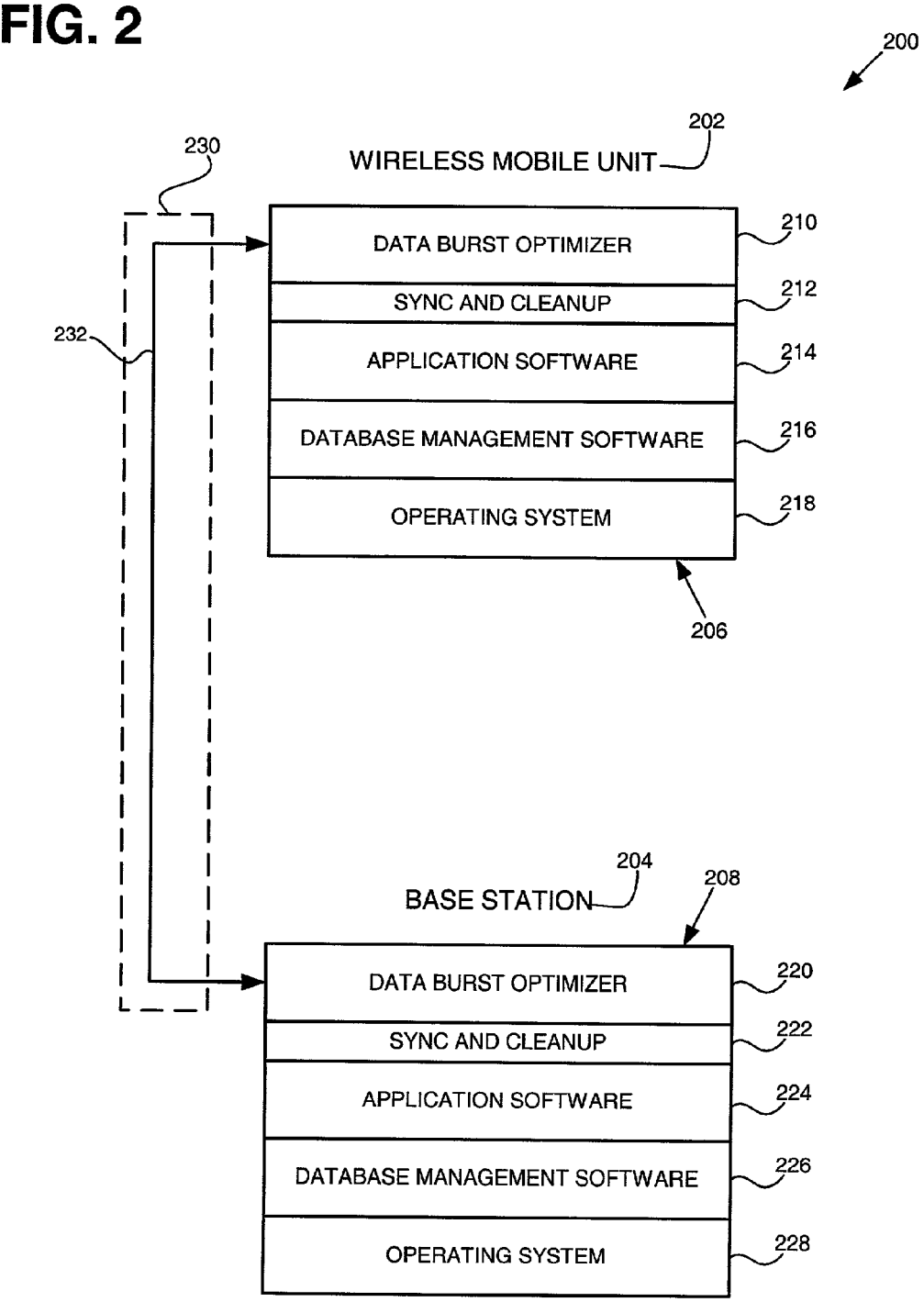
FIG. 2 is a block diagram of an exemplary wireless communication system in accordance with one embodiment of the invention.

Referring now to FIG. 2, communications system 200 illustrates software layers in wireless mobile unit 202 and base station 204 in accordance with one embodiment of the present invention. Table 206 illustrates software layers in wireless mobile unit 202, which corresponds to wireless mobile unit 102 in FIG. 1. Table 206 comprises data burst optimizer 210, sync and cleanup 212, application software 214, database management software 216, and operating system 218.

Data burst optimizer 210 corresponds to data burst optimizer 112 in wireless mobile unit 102 in FIG. 1. As shown, data burst optimizer 210 is situated in the top layer of table 206 and is configured to automatically synchronize the transfer of data between wireless mobile unit 202 and base station 204 at an optimal time and speed, i.e. at HDR speed when data burst optimizer 210 detects that wireless mobile unit 202 is in an HDR area. Thus, data burst optimizer 210 is configured to automatically synchronize the transfer of data between wireless mobile unit 202 and base station 204 at HDR speed whenever wireless mobile unit 202 has data to transfer to base station 204 and wireless mobile unit 202 is in HDR area 230.

In one embodiment, data burst optimizer 210 is configured to detect whether wireless mobile unit 202 is in HDR area 230 by "pinging" base station 204 over wireless connection 232 as discussed above. Sync and cleanup 212 is situated below data burst optimizer 210 in table 206 and functions as part of each application program. In one embodiment, sync and cleanup 212 synchronizes data transfer between an application on wireless mobile unit 202 and a similar application on base station 204.

In such instance, sync and cleanup 212 can also "clean up" the application if the data transfer between wireless mobile unit 202 and base station 204 is interrupted. For example, if an e-mail program on wireless mobile unit 202 is receiving e-mail from base station 204 in HDR area 230 and wireless mobile unit 202 moves out of HDR area 230, data burst optimizer 210 will shut down the e-mail program. Sync and cleanup 212 can "clean up" the e-mail program by marking which e-mails were sent and clearing off any partially sent e-mails. When wireless mobile unit 202 moves back into HDR area 230 and the e-mail program is reauthenticated, the e-mail program can resume sending and receiving e-mail in the proper sequence.

Referring again to FIG. 2, application software 214 can include, for example, e-mail programs such as email and music downloading programs such as napster. In one embodiment, application software 214 can further include stock quote, baseball score, and bids auction applications that use FTP. For example, wireless mobile unit 202 can run a stock quote FTP application and automatically receive updated stock quote information at HDR speed from base station 204 whenever wireless mobile unit 202 is in HDR area 230. In the above example, base station 204 can be connected to an FTP server.

Database management software 216 can include, for example, database management software. In one embodiment, wireless mobile unit 202 can run an Oracle database application that can be automatically updated at HDR speed via base station 204 whenever wireless mobile unit 202 is in HDR area 230. In such instance, base station 204 can be connected to a database server in a manner known in the art. Operating system 218 can be a commercially available operating system. In one embodiment, operating system 218 can be a CDMA-compatible operating system.

Continuing with FIG. 2, table 208 comprises data burst optimizer 220, sync and cleanup 222, application software 224, database management software 226, and operating system 228. Table 208, which illustrates layers of software at base station 204, is a mirror image of table 206 discussed above, which shows layers of software at wireless mobile unit 202. In one embodiment, whenever wireless mobile unit 202 is exchanging data with base station 204 in HDR area 230, whatever software running on wireless mobile unit 202 can be synchronized with similar software running on base station 204.

Thus, by providing similar software in wireless mobile unit 202 and base station 204, communications system 200 illustrated in FIG. 2 allows data burst optimizer 210 to synchronize a data exchange between wireless mobile unit 202 and base station 204 in HDR area 230.

Figure 3:
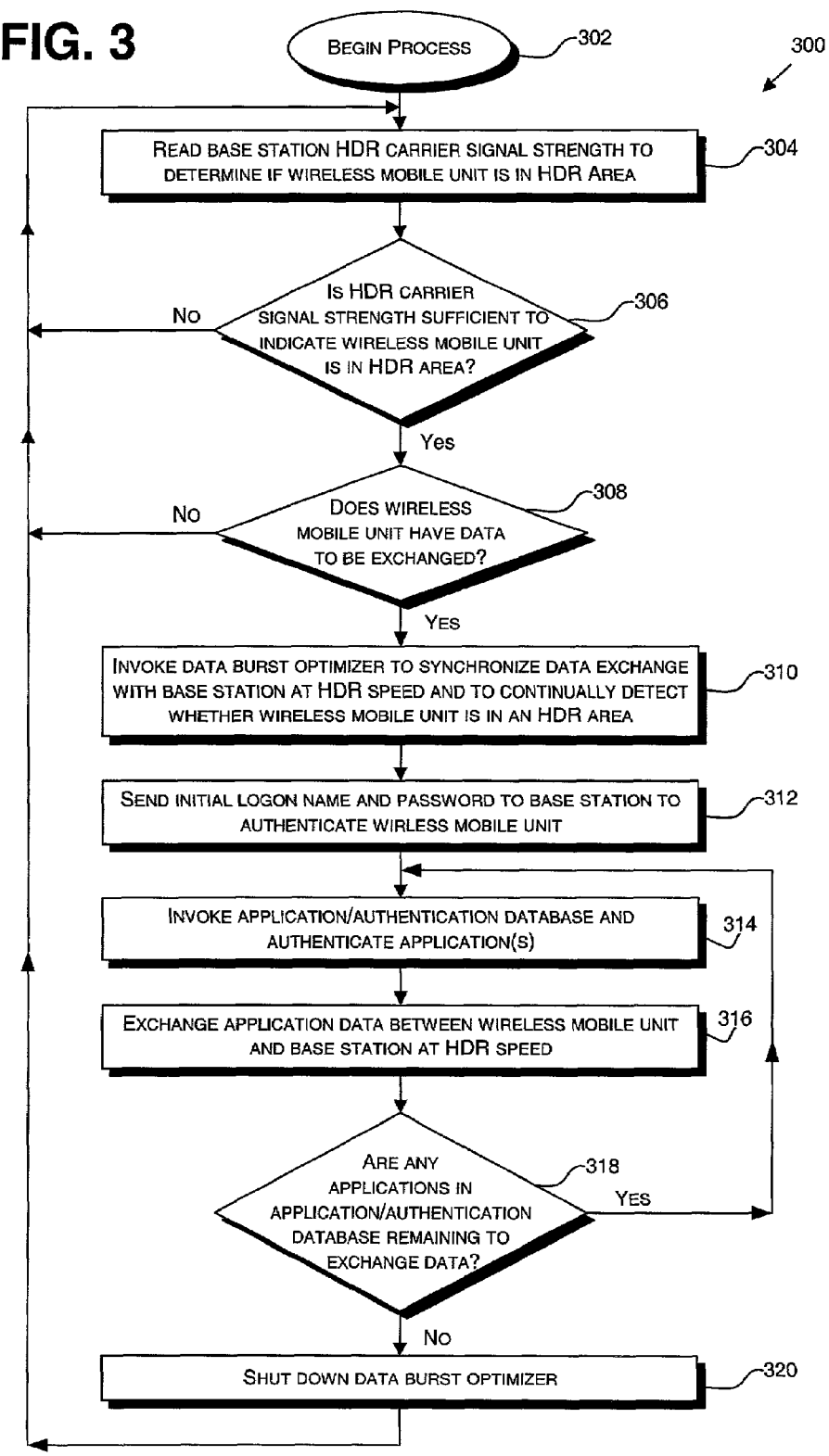
FIG. 3 is a flowchart of a process for automatically exchanging data at HDR speed between a wireless mobile unit and a base station in accordance with one embodiment of the invention.

Referring now to FIG. 3, flowchart 300 describes an exemplary process for automatically exchanging data at HDR speed between a wireless mobile unit and a base station in an HDR area. For illustrative purposes, the process shown in flowchart 300 will be described in the context of wireless mobile unit 102 and base station 104 in FIG. 1.

Continuing with FIG. 3, the process for automatically exchanging data at HDR speed between wireless mobile unit 102 and base station 104 in HDR area 106 begins at step 302 when wireless mobile unit 102 and base station 104 are not exchanging data. At step 304, base station HDR carrier signal strength is read to determine if the wireless mobile unit is in an HDR area. For example, processor 114 can read the signal strength level of the base station 104 HDR carrier signal on signal strength indicator 122 to determine if the signal strength is sufficiently strong to indicate that wireless mobile unit 102 is in HDR area 106. In another embodiment, processor 114 can "ping" base station 104 as discussed above to determine if wireless mobile unit 102 is in HDR area 106.

At step 306, if it is determined that the level of base station 104 HDR carrier signal strength is sufficient to indicate that wireless mobile unit 102 is in HDR area 106, the process proceeds to step 308. If it is instead determined at step 306 that the level of base station 104 HDR carrier signal strength is not sufficient to indicate that wireless mobile unit 102 is in HDR area 106, the process returns to step 304 to read a next base station 104 HDR carrier signal strength.

Continuing with flowchart 300, it is determined at step 308 whether wireless mobile unit 102 has data to be exchanged with base station 104. In one embodiment, processor 114 determines whether wireless mobile unit 102 has data to be exchanged with base station 104. If wireless mobile unit 102 has data to be exchanged with base station 104, the process proceeds to step 310. If wireless mobile unit 102 does not have data to be exchanged with base station 104, the process returns to step 304 to read a next base station 104 HDR carrier signal strength.

At step 310, data burst optimizer 112 is invoked to synchronize data exchange between wireless mobile unit 102 and base station 104 at HDR speed in HDR area 106. In one embodiment, when invoked, data burst optimizer 112 will continually "ping" base station 104 to determine whether wireless mobile unit 102 is in HDR area 106. For example, data burst optimizer 112 can use ping generator/analyzer 124 to "ping" base station 104 and analyze the Echo Reply packet sent from base station 104 in response to the "ping" to determine if wireless mobile unit 102 is in HDR area 106.

In another embodiment, when invoked, data burst optimizer 112 can detect the HDR carrier signal strength of base station 104 to determine if wireless mobile unit 102 is in HDR area 106. For example, data burst optimizer 112 can read the signal strength level of base station 104 indicated on signal strength indicator 122 and determine if the reading is high enough to indicate wireless mobile unit 102 is in HDR area 106. At step 312, a logon name and password is sent to base station 104 to authenticate wireless mobile unit 102. In one embodiment, initial logon authenticator 126 sends a logon name and password to base station 104 to authenticate wireless mobile unit 102.

Continuing with FIG. 3, at step 314 application/authentication database 128 is invoked and the first application in application/authentication database 128 is authenticated by transmission of a user name and password associated with the first application to base station 104. For example, if the first application is an e-mail application, the user name and password for the e-mail application would be sent to base station 104 to authenticate wireless mobile unit 102 (i.e. the user) for the e-mail application.

At step 316, data in the authenticated application is exchanged between wireless mobile unit 102 and base station 104 at HDR speed. For example, if the authenticated application in application/authentication database 128 is an e-mail application, wireless mobile unit 102 would send e-mail to and e-mail from base station 104 at HDR speed. At step 318, if there are more applications remaining in application/authentication database 128 to exchange data with base station 104, the process returns to step 314 to authenticate the next application. If there is no application remaining in application/authentication database 128 to exchange data with base station 104, the process proceeds to step 320.

At step 320, the data burst optimizer shuts down. At this point the process proceeds to step 304 to begin another cycle by reading a next base station 104 HDR carrier signal strength to determine if wireless mobile unit 102 is in HDR area 106. In one embodiment, steps 304 through 320 will automatically continue as long as wireless mobile unit 102 is activated. As discussed above, data burst optimizer 112, once invoked, will continually (i.e. at steps 310 through 318 as discussed above) determine whether wireless mobile unit 102 is in HDR area 106. If data burst optimizer 112 detects that wireless mobile unit 102 is not in HDR area 106, data burst optimizer 112 will shut down without exchanging further data with base station 104. At that point, the process will proceed to step 304 to begin another cycle as discussed above.

It is appreciated by those of skill in the art that the steps of flowchart 300 can be interchanged without departing from the scope of the present invention. Flowchart 300 in FIG. 3 thus illustrates an exemplary process for automatically exchanging data at HDR speed between a wireless mobile unit and a base station in an HDR area, in accordance with one embodiment.

Thus, in the manner described above, the invention provides system and method for data exchange in a high data rate wireless communication system. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. The software module, also called a computer program in the present application, may contain a number of source code or object code segments and may reside in any computer readable medium such as a RAM memory, flash memory, ROM memory, EPROM memory, EEPROM memory, registers, hard disk, a removable disk, a CD-ROM, a DVD-ROM or any other form of computer readable medium known in the art. It is noted that a code segment is also referred to as a "software object" in the present application. An exemplary computer readable medium is coupled to the processor, where the processor can read information from, and write information to, the computer readable medium. In the alternative, the computer readable medium may be integral to the processor. The processor and the computer readable medium may reside in an ASIC. The ASIC may reside in a mobile unit, base station transceiver, or satellite transponder. In the alternative, the processor and the computer readable medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A wireless mobile unit comprising:
   a signal strength indicator configured to detect when the wireless mobile unit is in a high data rate, code division multiple access (CDMA) area by determining whether a strength of a high data rate carrier signal broadcast by a base station exceeds a predetermined level;
   a processor being configured to determine a need for exchanging data between said wireless mobile unit and the base station; and
   a data burst optimizer configured to automatically exchange said data between said wireless mobile unit and said base station at a high data rate using code division multiple access when (a) the signal strength indicator detects said wireless mobile unit is in said high data rate, code division multiple access area, and (b) the processor determines a need for exchanging data between the wireless mobile unit and the base station,
   wherein said processor invokes said data burst optimizer to automatically exchange said data between said wireless mobile unit and said base station when said wireless mobile unit is in said high data rate CDMA area and when said processor determines said need to exchange said data between said wireless mobile unit and said base station, and
   wherein said data burst optimizer transmits a logon name and password to said base station to authenticate said wireless mobile unit.

2. The system of claim 1, wherein said data burst optimizer is configured to continuously detect when said wireless mobile unit is in said high data rate CDMA area.

3. The system of claim 2 wherein said data burst optimizer is configured to stop exchanging said data between said wireless mobile unit and said base station when said wireless mobile unit is not in said high data rate area.

4. A wireless mobile unit comprising:
   means for detecting when the wireless mobile unit is in an HDR (High Data Rate), code division multiple access (CDMA) area by determining whether a strength of a high data rate carrier signal broadcast by a base station exceeds a predetermined level;
   means for determining a need to exchange data between said wireless mobile unit and the base station; and
   means for automatically exchanging said data between said wireless mobile unit and said base station at a high data rate using code division multiple access when (a)

the wireless mobile unit is in said high data rate, code division multiple access area, and (b) there is a need for exchanging data between the wireless mobile unit and the base station, wherein said determining means invokes said exchanging means to automatically exchange said data when said wireless mobile unit is in said high data rate CDMA area and when said determining means determines said need to exchange said data between said wireless mobile unit and said base station, and wherein said exchanging means transmits a logon name and password to said base station to authenticate said wireless mobile unit.

5. The wireless communication system of claim 4 wherein said determining means invokes said exchanging means to automatically exchange said data when said wireless mobile unit is in said high data rate CDMA area.

6. The wireless communication system of claim 4 wherein said exchanging means continuously detects when said wireless mobile unit is in said high data rate CDMA area.

7. The wireless communication system of claim 6 wherein said exchanging means stops an exchange of said data between said wireless mobile unit and said base station when said wireless mobile unit is not in said high data rate area.

8. A method for exchanging data between a wireless mobile unit and a base station, said method comprising:
   detecting when said wireless mobile unit is in a high data rate, code division multiple access (CDMA) area by determining whether a strength of a high data rate carrier signal broadcast by the base station exceeds a predetermined level;
   determining a need for exchanging said data between said wireless mobile unit and said base station;
   invoking a data burst optimizer to synchronize an exchange of said data between said wireless mobile unit and said base station when there is a need for exchanging data between said wireless mobile unit and said base station;
   automatically exchanging said data between said wireless mobile unit and said base station at a high data rate using code division multiple access when said wireless mobile unit is in said high data rate, code division multiple access area and when said determining determines said need to exchange said data between said wireless mobile unit and said base station; and
   transmitting a logon name and password to said base station to authenticate said wireless mobile unit after said invoking and prior to said exchanging.

9. The method of claim 8 further comprising:
   pinging said base station to detect when said wireless mobile unit is in said high data rate, code division multiple access area after said invoking and prior to said exchanging.

10. The method of claim 9 wherein said pinging is performed by said data burst optimizer.

11. The method of claim 8, wherein said exchanging data occurs at a speed of 2.4 Megabits per second (Mbps).

12. A method for exchanging data between a wireless mobile unit and a base station, said method comprising:
   detecting when said wireless mobile unit is in a high data rate area;
   determining a need for exchanging said data between said wireless mobile unit and said base station;
   invoking a data burst optimizer to synchronize an exchange of said data between said wireless mobile unit and said base station;
   exchanging said data between said wireless mobile unit and said base station when said wireless mobile unit is in said high data rate area;
   invoking an application database in said wireless mobile unit; and
   authenticating at least one application in said application database with said base station.

13. A method for exchanging data between a wireless mobile unit and a base station, said method comprising:
   detecting when said wireless mobile unit is in a high data rate, code division multiple access (CDMA) area by determining whether a strength of a high data rate carrier signal broadcast by the base station exceeds a predetermined level;
   determining a need to exchange data between said wireless mobile unit and said base station;
   invoking a data burst optimizer to synchronize an exchange of said data between said wireless mobile unit and said base station;
   transmitting a logon name and password from said wireless mobile unit to said base station to authenticate said wireless mobile unit; and
   automatically exchanging said data between said wireless mobile unit and said base station at a high data rate using code division multiple access when (a) said wireless mobile unit is in said high data rate, code division multiple access area and (b) the need is determined to exchange data between said wireless mobile unit and said base station.

14. The method of claim 13 further comprising:
   pinging said base station to detect when said wireless mobile unit is in said high data rate, code division multiple access area after said invoking and prior to said transmitting.

15. The method of claim 14 wherein said pinging is performed by said data burst optimizer.

16. The method of claim 13 wherein said invoking is performed by a processor in said wireless mobile unit.

17. A method for exchanging data between a wireless mobile unit and a base station, said method comprising:
   detecting when said wireless mobile unit is in a high data rate area;
   determining a need to exchange data between said wireless mobile unit and said base station;
   invoking a data burst optimizer to synchronize an exchange of said data between said wireless mobile unit and said base station;
   transmitting a logon name and password from said wireless mobile unit to said base station to authenticate said wireless mobile unit;
   exchanging said data between said wireless mobile unit and said base station when said wireless mobile unit is in said high data rate area;
   invoking an application database in said wireless mobile unit after said transmitting; and authenticating at least one application in said application database with said base station prior to said exchanging.

18. A method for exchanging data between a wireless mobile unit and a base station, said method comprising:
   detecting when said wireless mobile unit is in a high data rate area;
   determining a need to exchange data between said wireless mobile unit and said base station;
   invoking a data burst optimizer to synchronize an exchange of said data between said wireless mobile unit and said base station;

transmitting a logon name and password from said wireless mobile unit to said base station to authenticate said wireless mobile unit;
invoking an application database in said wireless mobile unit;
authenticating at least one application in said application database with said base station; and
exchanging said data between said wireless mobile unit and said base station when said wireless mobile unit is in said high data rate area.

19. The method of claim 18 further comprising:
pinging said base station to detect when said wireless mobile unit is in said high data rate area after said invoking said data burst optimizer and prior to said transmitting.

20. The method of claim 19 wherein said pinging is performed by said data burst optimizer.

21. The method of claim 18 wherein said invoking said data burst optimizer is performed by a processor in said wireless mobile unit.

22. A computer readable medium including a computer program, said computer program implementing a method for exchanging data between a wireless mobile unit and a base station, said computer program comprising:
a first code segment for detecting when said wireless mobile unit is in a high data rate, code division multiple access (CDMA) area by determining whether a strength of a high data rate carrier signal broadcast by the base station exceeds a predetermined level;
a second code segment for determining a need for exchanging said data between said wireless mobile unit and said base station;
a third code segment for invoking a data burst optimizer to synchronize an exchange of said data between said wireless mobile unit and said base station;
a fourth code segment for automatically exchanging said data between said wireless mobile unit and said base station at a high data rate using code division multiple access when said wireless mobile unit is in said high data rate, code division multiple access area and when said second code segment determines said need to exchange said data between said wireless mobile unit and said base station; and
a fifth code segment for transmitting a logon name and password to said base station to authenticate said wireless mobile unit.

23. A computer readable medium including a computer program, said computer program implementing a method for exchanging data between a wireless mobile unit and a base station, said computer program comprising:
a first code segment for detecting when said wireless mobile unit is in a high data rate area;
a second code segment for determining a need for exchanging said data between said wireless mobile unit and said base station;
a third code segment for invoking a data burst optimizer to synchronize an exchange of said data between said wireless mobile unit and said base station;
a fourth code segment for exchanging said data between said wireless mobile unit and said base station when said wireless mobile unit is in said high data rate area;
a fifth code segment for transmitting a logon name and password to said base station to authenticate said wireless mobile unit;
a sixth code segment for invoking an application database in said wireless mobile unit; and
a seventh code segment for authenticating at least one application in said application database with said base station.

24. The computer readable medium of claim 23 wherein said computer program further comprises:
an eighth code segment for pinging said base station to detect when said wireless mobile unit is in said high data rate area.

* * * * *